G. CUMERFORD AND J. S. LINGARD.
GEARING.
APPLICATION FILED DEC. 30, 1915. RENEWED SEPT. 11, 1919.
1,319,926. Patented Oct. 28, 1919.
2 SHEETS—SHEET 1.
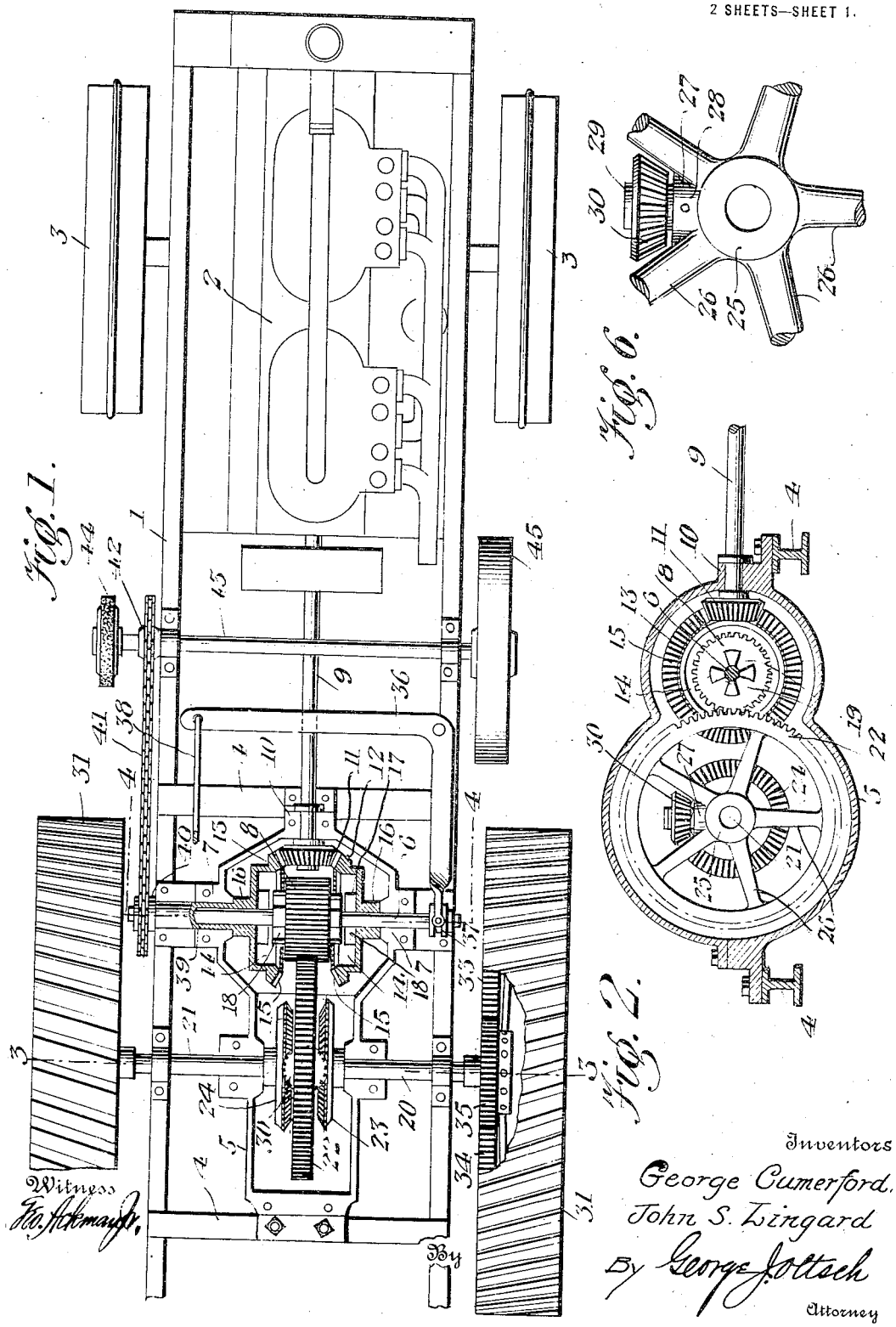

G. CUMERFORD AND J. S. LINGARD.
GEARING.
APPLICATION FILED DEC. 30, 1915. RENEWED SEPT. 11, 1919.
1,319,926.
Patented Oct. 28, 1919.
2 SHEETS—SHEET 2.
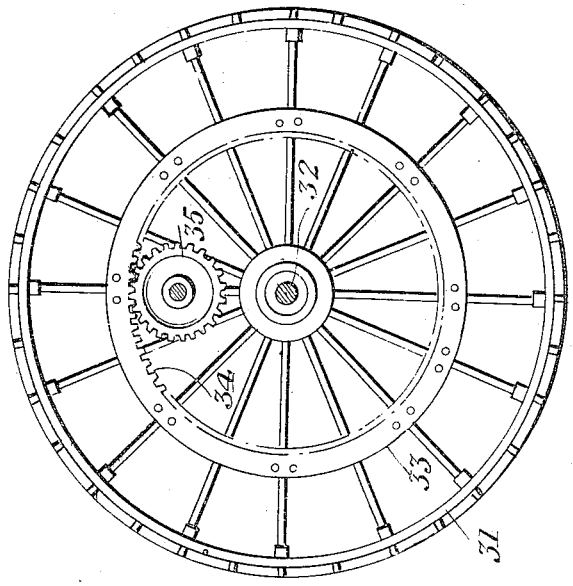
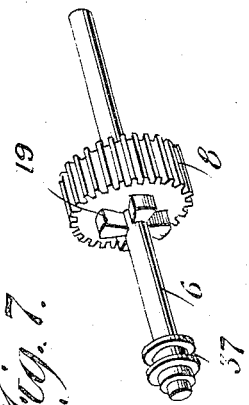
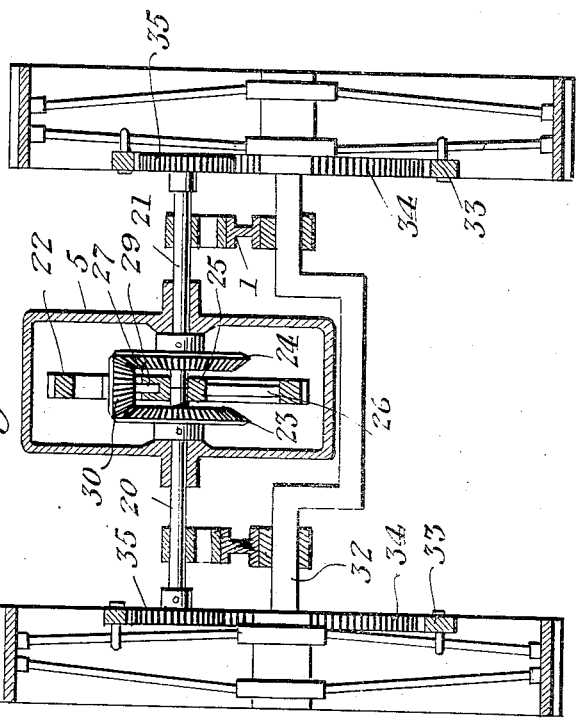
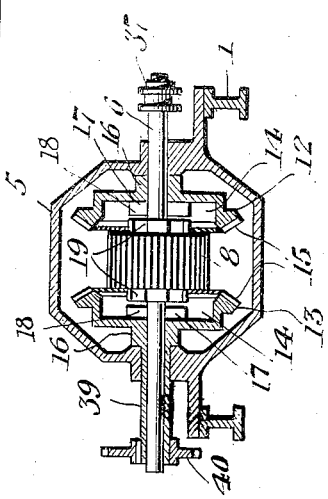
Witness
Geo. Ackman Jr.
Inventor
George Cumerford,
John S. Lingard.
By George Joltick
Attorney

UNITED STATES PATENT OFFICE.

GEORGE CUMERFORD, OF WALKERTON, AND JOHN S. LINGARD, OF LAPORTE, INDIANA.

GEARING.

1,319,926.  Specification of Letters Patent.  Patented Oct. 28, 1919.

Application filed December 30, 1915, Serial No. 69,339.  Renewed September 11, 1919.  Serial No. 323,127.

*To all whom it may concern:*

Be it known that we, GEORGE CUMERFORD and JOHN S. LINGARD, citizens of the United States, residing, respectively, at Walkerton, in the county of St. Joseph, and at Laporte, in the county of Laporte, and State of Indiana, have invented certain new and useful Improvements in Gearing, of which the following is a specification.

The invention is directed to a tractor and more particularly to a driving mechanism for traction devices.

The improvement is constructed with a view to providing what may be termed a transmission mechanism, of particular construction, permitting a single forward and a single reverse speed, or a driving action without effect upon the travel of the vehicle for auxiliary purposes.

The improvement also contemplates an improved type of differential mechanism, particularly designed for use with tractors and capable of sustained and severe usage, while at the same time wholly flexible to compensate for the necessary different travel of the ground wheels.

The invention in the preferred form of details will be described in the following specification, reference being had particularly to the accompanying drawings, in which:

Figure 1 is a plan of the improved tractor, the gear case being shown in section to illustrate the gear connections;

Fig. 2 is a longitudinal section through the gear case, a portion of the driving shaft being shown;

Fig. 3 is a section on the line 3—3 of Fig. 1;

Fig. 4 is a section on the line 4—4 of Fig. 1;

Fig. 5 is an elevation of one of the ground wheels;

Fig. 6 is an enlarged broken elevation of the main gear of the differential mechanism;

Fig. 7 is a perspective view of the clutch connection between the manually operable shaft and transmission and the intermediate gear thereof.

The improved tractor includes any usual or preferred type of chassis 1, on the forward portion of which is supported the engine 2, also of any usual or preferred form. In the instance shown, the tractor chassis is supported at the front upon the usual free forward ground wheels 3, preferably designed as shown for tractor work, it being understood that aside from the specific details hereinafter referred to, the chassis or frame structure is complete in providing the usual or desirable parts of the tractor. For example, we contemplate the usual steering mechanism, body, connections where necessary, and such other parts as may be further advisable in perfecting the structure, it being understood that the parts noted may be of any usual or preferred construction, and the present invention is not concerned with such parts, but is directed particularly to the driving means and the control therefor.

Supported on a particular part of the chassis, beyond the engine parallel transverse supports 4 positioned and designed for supporting it, is a gear case 5, preferably formed in sections to provide accessibility to the interior gears, the form of gear case for the particular construction of gear arrangement illustrated being substantially as shown in outline in Fig. 1.

The relatively forward portion of the gear case is enlarged laterally to receive the gearing which will hereinafter be termed the transmission mechanism. Such gearing involves a shaft 6 disposed for comparatively free longitudinal movement, and freely rotatable in bearings 7, forming side projections of the gear case. On the shaft 6 is keyed or otherwise secured about centrally of such shaft, a drive gear 8, such gear having a comparatively broad gear face, for a purpose which will presently appear. The crank shaft 9 of the engine extends longitudinally to the gear case and will be hereinafter termed the drive shaft. This drive shaft extends through end bearing 10 of the gear case, and within the latter is provided with a bevel gear 11, disposed in line with the main drive gear 8.

Mounted upon the transverse gear shaft 6 are opposed bevel gears 12 and 13. These gears are practically identical in structure, each including a hollow body 14, the forward enlarged peripheral edge of which is formed with gear teeth 15. The body outwardly beyond the gear teeth is formed to provide a hub 16, which is freely rotatable upon the gear shaft 6, each hub being extended within the hollow body to form a clutch member 17 comprising a series of radially disposed recesses 18 formed by such extension.

The drive gear 8 is provided on opposite sides thereof and integral therewith with clutch members 19, to interfit with the recesses 18. In this connection it is, of course, to be understood that the clutch members 18 and 19 may be of any desired formation, there being no specific restriction herein to the particular detail illustrated. The object sought is to provide a means whereby, in the proper longitudinal shifting of the gear shaft 6, either gear 12 or 13 may be locked with relation to such shaft, and any clutch construction which will accomplish this object is contemplated as within the spirit of the present invention.

As previously stated, the gears 12 and 13 are arranged on opposite sides of the main drive gear 8, the disposition being such that the said gears 12 and 13, or rather the gear teeth 15 of such gears are at all times in operative mesh with the bevel gear 11 of the drive shaft, hence the said gears 12 and 13 are continuously rotated in the operation of the engine.

The differential mechanism is also mounted within the gear case 5, and comprises a transverse shaft made up of independent end abutting sections 20, 21. Loosely mounted upon the said sections 20 and 21, at their abutting ends, is a gear 22, designed to be at all times in mesh with the main drive gear 8. Secured upon each shaft section 20 and 21, immediately adjacent the gear 22 are bevel gears 23, 24, respectively, these gears being fixed upon the respective shaft sections and duplicates as to detail. The gear 22, which will be hereinafter termed the ring gear, includes the usual hub 25, from which spokes 26 radiate, supporting the ring forming the periphery of the gear. The hub intermediate one pair of spokes 26 is enlarged or thickened at 27, in which is formed a bearing 28 for a stub shaft 29, carrying a bevel gear 30. The bevel gear is of such size as to operatively engage both gears 23, 24, the bevel gear constituting the driving connection between the ring gear 22 and said gears 23, 24.

The rear wheels 31, which may be of any usual tractor form, are mounted upon an axle 32 of any desired construction, and supported in any desired manner from the chassis. Each tractor wheel is provided with a ring 33 removably secured thereto, having gear teeth 34 on the inner peripheral edge thereof. The ring 33 is of such size and so located that the shaft sections 20, 21, may extend within said gear teeth, said shaft sections being terminally provided within the ring 33 with pinions 35 at all times in mesh with the teeth 34 of the ring 33.

The shaft 6 is manually controlled in its position, through the medium of any desired connections, in the present instance, such connections including an angle lever 36 having the usual collar connection 37 with one terminal of the shaft 6, the free end of the lever, through rod 38, being connected to a hand lever or other suitable means for accomplishing the desired longitudinal movement of such shaft 6.

As an important adjunct to the described tractor, we provide means for operating an auxiliary mechanism to permit the use of the tractor as a stationary engine. For such purpose the hub 16 of one of the speed gears of the transmission mechanism, as 13, is extended within the bearing 7 in the form of a sleeve 39. The sleeve is extended beyond the bearing and provided with a sprocket wheel 40 adapted to actuate, through the medium of a sprocket chain 41 and a sprocket 42 secured thereon, an auxiliary shaft 43 mounted on the chassis or frame more or less remote from the transmission mechanism. The shaft 43 is extended beyond the frame and terminally provided for accomplishing any particular desired function. For example, one end thereof is shown as provided with an emery wheel 44, which may be used for sharpening purposes, and the opposite end thereof provided with a belt wheel 45 by which connection may be made to any apparatus which it is desired to operate.

In use, it will be apparent that the power of the engine will drive the crank or drive shaft 9 and so rotate the pinion 11 and the gears 12 and 13. As long as the gear 8 is in neutral position, that is, beyond clutching coöperation with either gear 12 or 13, the movement thus described will not be transmitted to the differential mechanism, it being obvious that in such neutral position the main drive gear 8 is not rotated. Desiring to operate the tractor in either the forward or reverse direction, the shaft 6 is appropriately shifted longitudinally to cause clutching coöperation between the gear 8 and the particular gear 12 or 13, as the case may be. This immediately transmits the movement of such clutching gear 12 or 13 to the differential mechanism through the main drive gear 8 and ring gear 22. The operation of the ring gear will, through the bevel gear 30 fixed thereon, drive the gears 23, 24, operating the shaft sections 20, 21, and actuating the pinions 35 to drive the wheels. So long as the tractive power of the wheels is proceeding in a straight line, that is, when there is no more retarding effect upon one than on the other, the resistance of the wheels is, through the gears 23 and 24, applied at diametrically opposed points of the bevel gear 30 with the result that such gear is then in effect fixed with relation to the ring gear and so operates to drive both gears 23, 24 without slip and in the same direction. In the event of differential resistance of the tractor wheels, however, as in turning corners or the like, a rotative action of the bevel gear 30 is permitted to compensate therefor, hence providing the differential action necessary in the increased travel of one rear wheel as compared to the other.

It is, of course, apparent that the gears 12 and 13 are continuously operated, hence the shaft 43 is continuously driven without regard to the movement of the tractor, hence the auxiliary devices are capable of use with the tractor at a standstill, thus providing in effect a stationary engine. The main drive gear 8 has a somewhat extended face as previously stated, in order to maintain gearing coöperation with the ring gear 22 in the longitudinal movement of the shaft 6 for coöperation with either gear 12 or 13, as stated. The gear case provides an effective protection for the gears, the disposition described requiring but a single case, and materially facilitating necessary lubrication and inspection.

What is claimed is:

A driving mechanism including an endwise shiftable shaft, a main gear fixed thereon, opposed clutch gears loosely mounted on said shaft and adapted for selective connection with the main gear by a shifting of the latter, one of said clutch gears having an elongated tubular hub receiving one end of the shaft, a pulley mounted on the outer end of said hub, and a driven gear in mesh with both of the clutch gears for continuously driving the same.

In testimony whereof we affix our signatures in presence of two witnesses.

GEORGE CUMERFORD.
JOHN S. LINGARD.

Witnesses:
GEORGE J. OLTSCH,
NINA LEE.